(12) United States Patent
Blase

(10) Patent No.: US 6,945,027 B2
(45) Date of Patent: Sep. 20, 2005

(54) ENERGY DRAG CHAIN

(75) Inventor: Frank Blase, Bergisch Gladbach (DE)

(73) Assignee: Igus Spritzgubteile Fue Die Industrie GmbH, Koln (DE)

( * ) Notice: Subject to any disclaimer, the term of this patent is extended or adjusted under 35 U.S.C. 154(b) by 0 days.

(21) Appl. No.: 10/381,234

(22) PCT Filed: Sep. 20, 2001

(86) PCT No.: PCT/DE01/03600
§ 371 (c)(1),
(2), (4) Date: Sep. 5, 2003

(87) PCT Pub. No.: WO02/25790
PCT Pub. Date: Mar. 28, 2002

(65) Prior Publication Data
US 2005/0097878 A1 May 12, 2005

(30) Foreign Application Priority Data
Sep. 21, 2000 (DE) .................................... 200 16 363 U

(51) Int. Cl.[7] ............................................... F16G 13/16
(52) U.S. Cl. ........................... 59/78.1; 248/49; 248/51; 59/900
(58) Field of Search ..................... 59/78.1, 900, 901; 248/49, 51

(56) References Cited

U.S. PATENT DOCUMENTS

| 4,625,507 A | 12/1986 | Moritz et al. | 59/78.1 |
| 4,852,342 A * | 8/1989 | Hart | 59/78.1 |
| 5,240,209 A | 8/1993 | Kutsch | 248/49 |
| 5,243,814 A * | 9/1993 | Hart | 59/78.1 |
| 5,497,536 A * | 3/1996 | Hart | 248/51 |
| 6,387,002 B1 | 5/2002 | Gunter | 474/206 |
| 6,609,684 B2 * | 8/2003 | Van Scoy et al. | 248/49 |

FOREIGN PATENT DOCUMENTS

| DE | 34 97 169 | 1/1986 |
| DE | 195 25 478 | 1/1997 |
| DE | 197 01 706 | 9/1998 |
| DE | 198 00 295 | 10/1998 |
| DE | 198 20 651 | 11/1999 |
| GB | 2 200 716 | 1/1988 |
| JP | 09-133257 | 5/1997 |

* cited by examiner

Primary Examiner—David B. Jones
(74) Attorney, Agent, or Firm—Grossman Tucker Perrault & Pfleger, PLLC

(57) ABSTRACT

The invention relates to an energy drag chain for guiding cables, pipes or the like between two connection points that are movable relative to each other and that is configured by a single strand of flat links comprising chain links (5) that are hinged to one another and can be bent relative to one another. At least some of said chain links (5) are provided with at least one support (1) that comprises a compartment for receiving the cables (2) that is open in the longitudinal direction of the chain. The aim of the invention is to provide a device that is simple in design and that allows support and guidance of the cable in a simple manner. To this end, the support comprises at least one element for modifying the cross-section of the compartment for receiving the cables (2) with which the cross-section can lie manually adjusted.

15 Claims, 5 Drawing Sheets

ENERGY DRAG CHAIN

Figure 1:
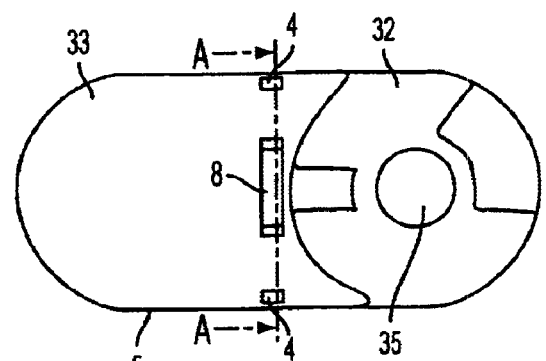

The invention relates to an energy drag chain for guiding cables, tubes or the like between two connection points that are movable relative to each other, where the chain is configured by a single strand of flat links comprising chain links that are hinged to one another and can bend relative to one another, and where at least some of the chain links are provided with a support comprising a compartment for receiving cables that is open in the longitudinal direction of the chain.

Energy drag chains with a single strand of chain links and a support arranged on the chain links are known, where the support displays two transverse webs on at least one side at the edges of the chain link. The webs are essentially rigid and can be connected at their free ends by means of a likewise rigid connecting web.

Energy drag chains of this kind are suitable for normal to high loads and travel speeds. However, they are relatively heavy and of complex design. Chain links of different heights and transverse webs of different lengths are available for varying numbers of cables and cable cross-sections. If the cross-section of the compartment for receiving the cables needs to be altered, the chain links and/or transverse webs must be exchanged.

The object of the invention is to devise a simple design for holding and guiding cables, particularly for lightweight energy drag chains that travel at relatively slow speeds.

The object is solved in that the support comprises at least one element for modifying the cross-section of the compartment for receiving the cables, with which the cross-section can be manually adjusted.

Due to the design according to the invention, the cross-section of the compartment for receiving the cables can be manually adjusted without exchanging parts, such as chain links and/or transverse webs, or altering parts. The compartment for receiving the cables, which is enclosed by the support, can thus be adapted to the cross-sectional area of the cable strand without having to change the support, in order to securely hold and guide the cables. The cables can be easily inserted into the support, after which the cable strand is closely surrounded by the support due to the element used to change the cross-section of the compartment for receiving the cables. With the help of this element, the support can lie against the circumference of the cable strand under pretension.

In a preferred embodiment of the invention, the element for changing the cross-section of the cable compartment comprises at least one flexible strip and two flexible ends, which can be connected to one another in various positions in the longitudinal direction relative to one another.

In a configuration of this kind, rigid parts of the support, such as the known transverse webs and connecting webs, can be eliminated completely. The flexible strip(s) position themselves flexibly around the circumference of the cable strand, meaning that the strand is held particularly securely on the chain links.

In a particularly simple embodiment, the flexible strip comprises a cable binder.

The flexible strip can pass through lateral openings at the edges of the chain link in the form of a loop. The cable support arranged on the chain link thus consists only of a cable binder, for example.

In order to obtain a larger, variable cable compartment, webs can be provided at the edges of the chain link, where the flexible strip passes through openings in the webs in the form of a loop. The webs are preferably of flexible design and have numerous openings at different heights through which the flexible strip can be passed.

In another preferred embodiment of the invention, two flexible strips in the form of webs are provided, one end of each being attached at a lateral edge of the chain link and each displaying fastening elements for connection to one another in various positions.

Any suitable means enabling variable and preferably separable connection of the flexible strips can be considered for the fastening elements.

In particular, one of the webs can have openings distributed in the longitudinal direction and the other web can have nibs distributed in the longitudinal direction that can be pressed into the openings.

In another practical example, a longer web with openings distributed in the longitudinal direction is provided, as well as a shorter web, which has nibs arranged in the longitudinal direction on its outer side that have a longitudinal cross-section of toothed shape for snapping into the openings. Guide tabs are provided on the outer side of the shorter web, on either side of the nibs, in order to hold the longer web in place when it is bent over the outer side of the shorter web.

In another preferred embodiment of the invention, the support has two lateral webs, each of which is provided at a lateral edge of the chain link, and at least one connecting web, which is arranged between the lateral webs and can be adjusted in the longitudinal direction of the lateral webs. The webs can be of essentially rigid design. Due to the connecting web that can be adjusted in the longitudinal direction of the lateral webs, the support can lie tightly around the circumference of the cable strand, and under pretension if necessary.

In addition, the two sides of the lateral webs can have guide rails in the longitudinal direction, and the connecting web can have lateral guide grooves on its ends for sliding adjustment along the lateral webs.

In particular, a snap connection can be provided between the lateral webs and the connecting web in order to lock it in various positions.

The connecting web can also be arranged on the guide rails in non-positive fashion, meaning that a predetermined force is required to shift it along the lateral webs.

Loss of the connecting web is prevented in that the free ends of the lateral webs are each provided with a stop for the connecting web.

In a particularly simple configuration of the energy drag chain according to the invention, the chain links are of cranked design, each having in reference to the support an outwardly cranked region and an inwardly cranked regions which are provided with connecting elements for the hinged connection of the chain links to adjacent chain links, where the inside of the outwardly cranked region of a link is in contact with the inwardly cranked region of the adjacent link.

A contribution to the simple design of the energy drag chain can also be made by providing each chain link with pins in one hinge region and corresponding openings in the other hinge region, in order to enable hinged connection of the chain links to one another.

A snap connection is preferably provided between the pins and openings of the chain links for simple joining of the chain links.

Particularly favourable force and stability conditions are established if the support according to the invention is arranged roughly in the middle between the hinged axes of the chain links.

The energy drag chain according to the invention is particularly suitable for travel on a horizontal substrate. In this case, one side of the chain links lies on the substrate. Cables can very easily be inserted into the open support on the top side of the chain links. When the support closes, it positions itself tightly around the circumference of the inserted cable strand, under pretension if necessary.

Figure 2:
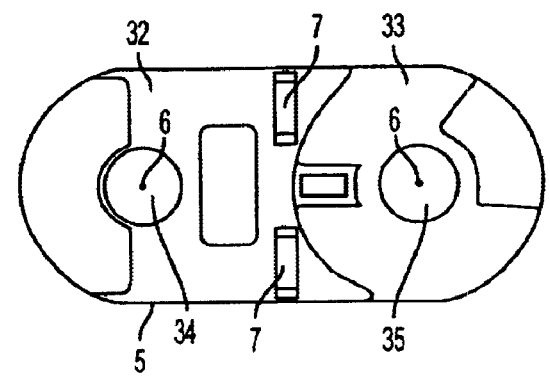
Figure 3:
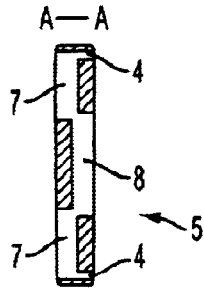
Figure 4:
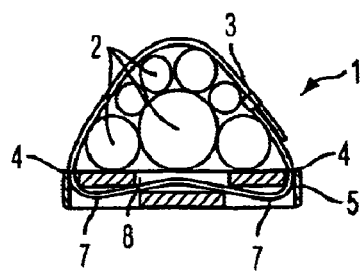
Figure 5:
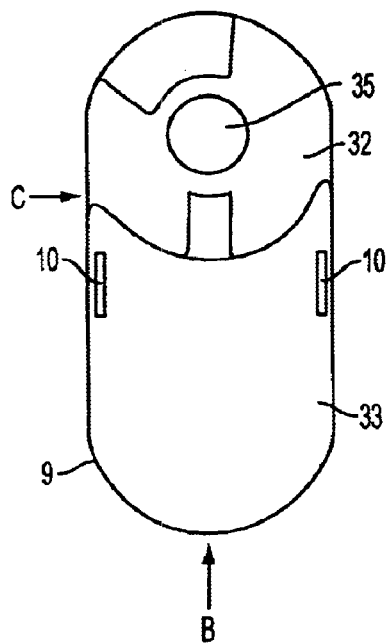
Figure 6:
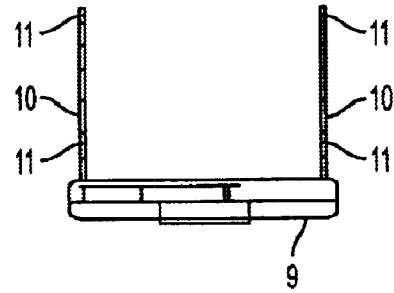
Figure 7:
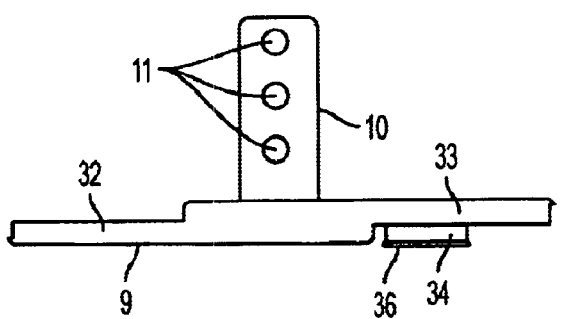
Figure 8:
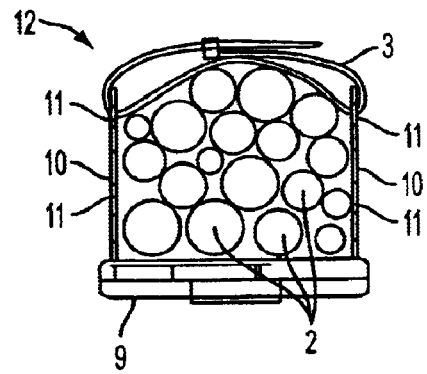
Figure 9:
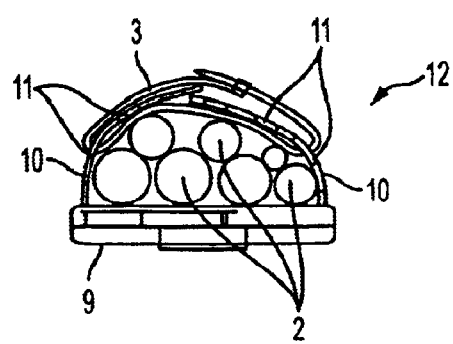
Figure 10:
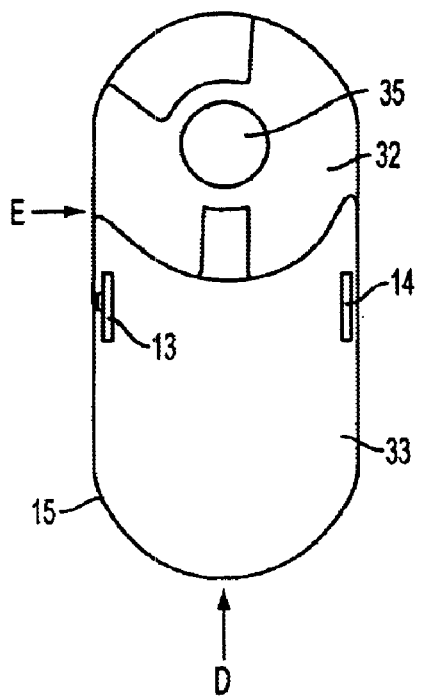
Figure 11:
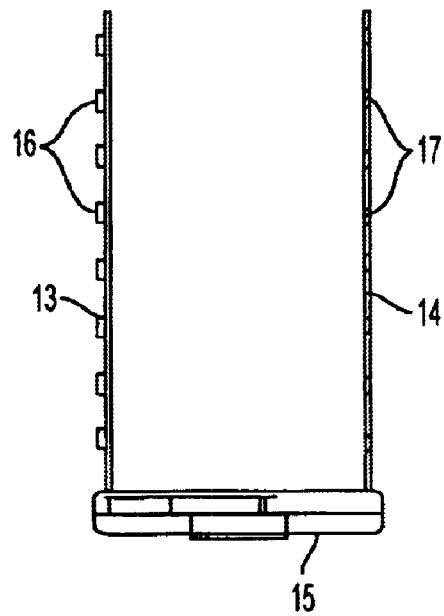
Figure 12:
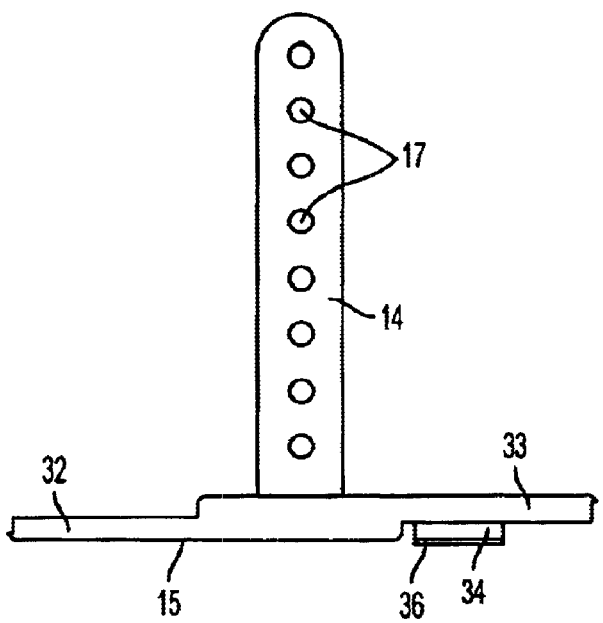
Figure 13:
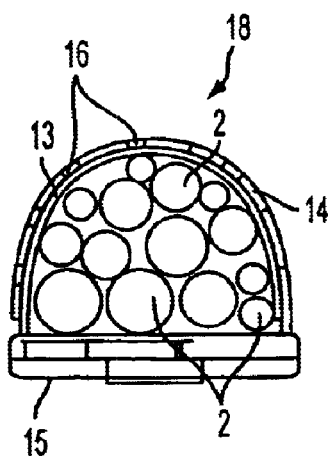
Figure 14:
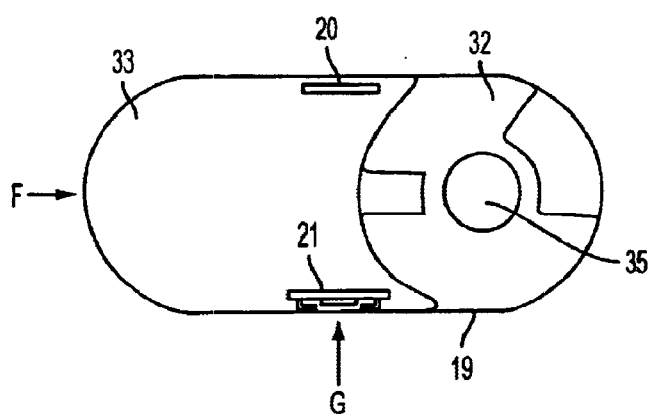
Figure 15:
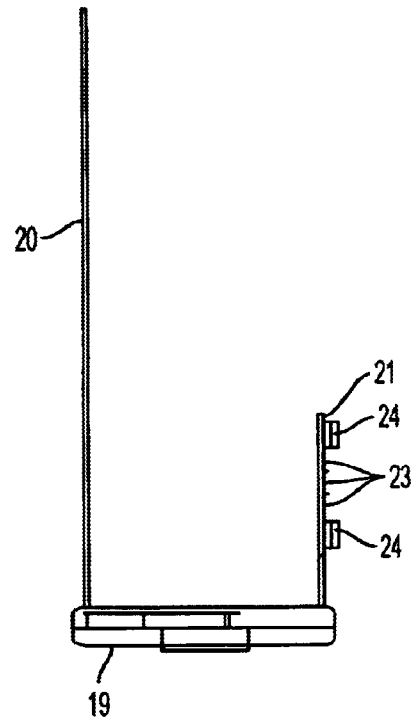
Figure 16:
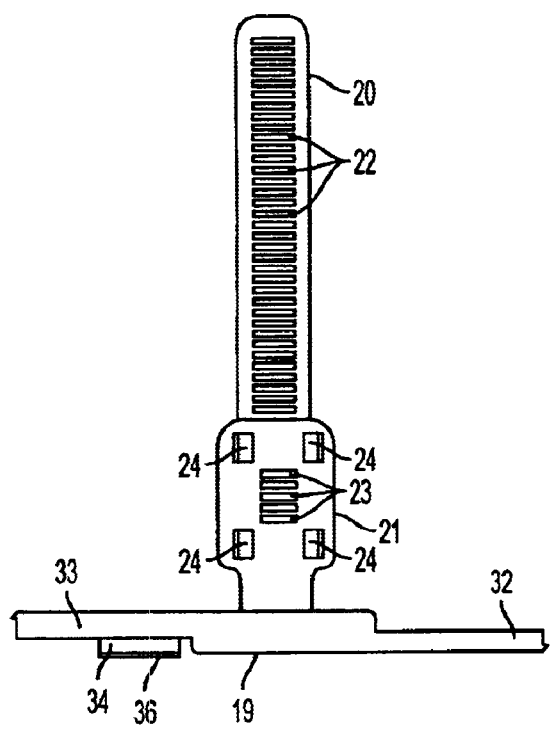
Figure 17:
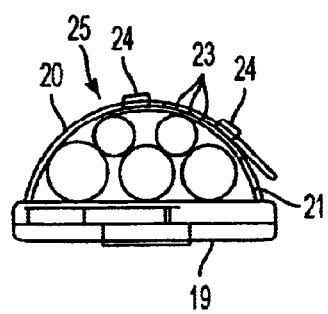
Figure 18:
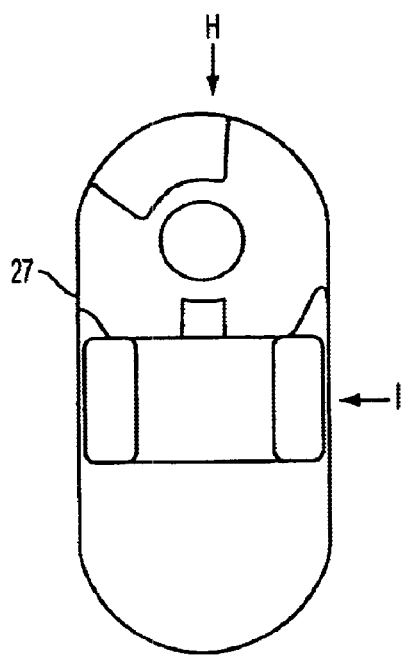
Figure 19:
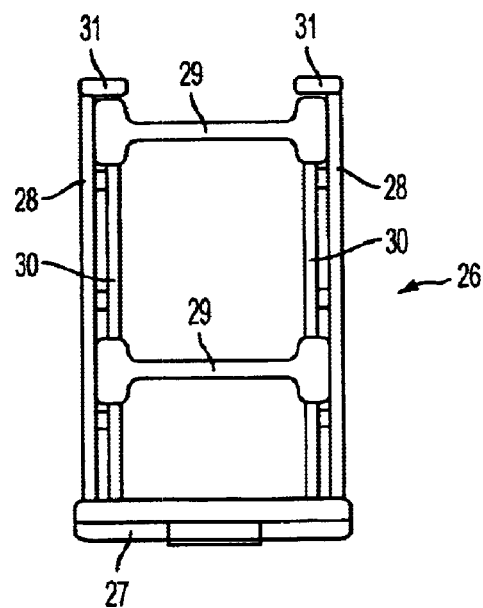
Figure 20:
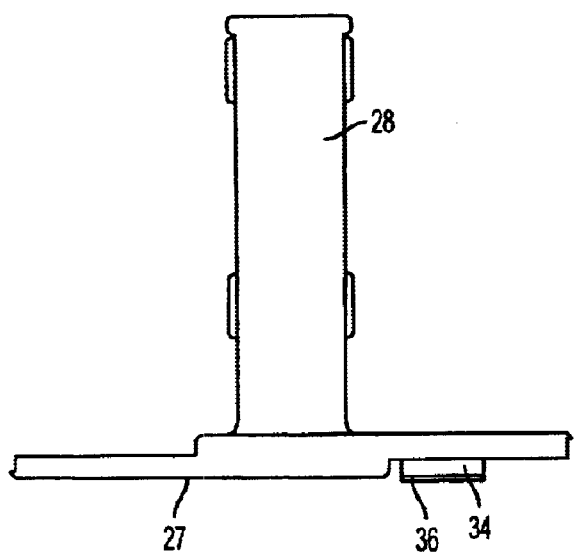
Figure 21:
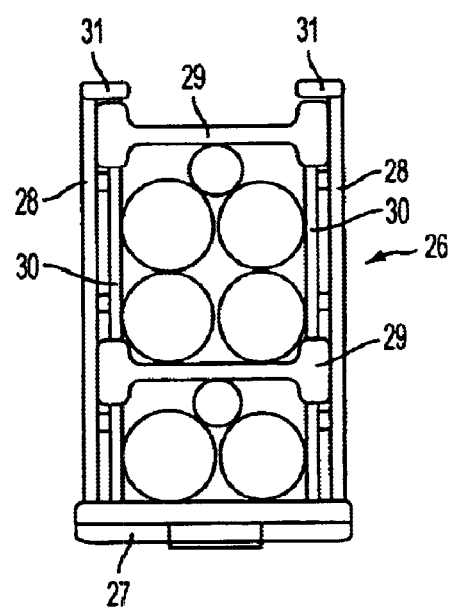

Several practical examples of the invention are described in more detail below on the basis of the drawings. The drawings show the following:

FIG. 1 A view of the side of a chain link facing the support,

FIG. 2 A view of the other side of the chain link,

FIG. 3 A cross-section along line A—A in FIG. 1,

FIG. 4 A cross-section as in FIG. 3, with-a support enclosing a cable strand,

FIG. 5 A view of the side of another chain link facing the support,

FIG. 6 A front view of the chain link in the direction of arrow B in FIG. 5,

FIG. 7 A view of the chain link in FIG. 5 in the direction of arrow C,

FIG. 8 A front view of the chain link in FIG. 5 in the direction of arrow B, with a cable strand of relatively large cross-section attached to it, FIG. 9 A front view of the chain link in FIG. 5 in the direction of arrow B, with a cable strand of relatively small cross-section attached to it, FIG. 10 A view of the side of another chain link facing the support, FIG. 11 A front view of the chain link shown in FIG. 10 in the direction of arrow D, FIG. 12 A view of the chain link shown in FIG. 10 in the direction of arrow E, FIG. 13 A front view according to FIG. 11, with a support arranged around a cable strand, FIG. 14 A view of the side of another chain link facing the support, FIG. 15 A front view of the chain link shown in FIG. 14 in the direction of arrow F, FIG. 16 A view of the chain link shown in FIG. 14 in the direction of arrow G, FIG. 17 A front view according to FIG. 15, with a support arranged around a cable strand, FIG. 18 A view of the side of another chain link facing the support, FIG. 19 A front view of the chain link shown in FIG. 18 in the direction of arrow H, FIG. 20 A view of the chain link shown in FIG. 18 in the direction of arrow I, and FIG. 21 A front view according to FIG. 19, with cables inserted in the support.

In the practical example shown in FIGS. 1 to 4, support 1 comprises flexible strip 3, which is wrapped around cables 2 and designed as a cable binder.

As shown particularly clearly in FIG. 4, flexible strip 3 is passed through lateral openings 4 at the edges of chain link 5 in the form of a loop. The edges are those edge areas of chain link 5 that are parallel to the line connecting the two hinged axes 6 and that face the support. Inside chain link 51 flexible strip 3 runs through a channel provided transverse to the longitudinal direction of chain link 5. For inserting flexible strip 3 into the channel, chain link 5 is provided, on the side facing away from the support with wider openings 7 opposite openings 4. These openings are connected to opening 8, which is located on the side of chain link 5 facing the support and overlaps openings 7. Openings 4, 7 and 8 lie roughly in a line in the transverse direction of chain link 5.

After the end of the cable binder without the fastening eye has been pulled through chain link 5, cables 2 are inserted into the open cable binder, which is then pulled tight by passing the free end through the fastening eye until it is tight around the cable strand and pretensioned if necessary.

The practical example illustrated in FIGS. 5 to 9 shows flexible webs 10, which are located at the lateral edges of chain link 9 and display numerous openings 11 at different heights that allow flexible strip 3 to be passed through. Flexible strip 3 is passed through two opposite openings 11 in webs 10 in the form of a loop. Looped flexible strip 3 thus forms the part of the support that is opposite to chain link 9, where the support in this practical example comprises webs 10 and flexible strip 3.

Webs 10 are integrally moulded on chain link 9.

Support 12 can be adapted to the cross-section of the cable strand by passing flexible strip 3 through suitable openings 11 in webs 10 and then pulling it tight in the form of a loop so that flexible webs 10 and flexible strip 3 are tight around the cable strand.

FIG. 8 shows such an arrangement with a cable strand of relatively large cross-section, while FIG. 9 shows a closer ties around a cable strand with a relatively small cross-section.

In the practical example shown in FIGS. 10 to 13, two flexible strips 13 and 14 in the shape of webs are integrally moulded on the lateral edges of chain link 15. The two flexible strips are of roughly the same length. Flexible strips 13 and 14 have fastening elements for connection to one another in various positions.

To provide fastening elements, flexible strip 13 (on the left in FIG. 11) has outwardly protruding nibs 16 distributed over its height, while flexible strip 14 (on the right in FIG. 11) has openings 17 distributed over its height. Nibs 16 and openings 17 are equally spaced, meaning that the two flexible strips 13 and 14 can be bent over one another and nibs 16 can be pressed into openings 17 in various positions relative to one another.

As shown in FIG. 13, support 18, comprising flexible strips 13 and 14, can be adapted to the cross-section of a cable strand by selecting different overlaps between flexible strips 13 and 14.

In the practical example shown in FIGS. 14 to 17, two flexible strips 20 and 21 with fastening elements for connection to one another in various positions are likewise integrally moulded on the lateral edges of chain link 19.

Flexible strip 20 (on the left in FIG. 15) has slotted openings 22 distributed over its height and extending parallel to chain link 19. Flexible strip 21 (on the right in FIG. 15) is shorter and provided on its outer side with nibs 23, which extend in the longitudinal direction of the chain link, are arranged vertically and have a longitudinal cross-section of toothed shape. Guide tabs 24 are provided on the outer side of flexible strip 21, on either side of nibs 23, in order to hold flexible strip 20 in place when it is bent over the outer side of flexible strip 21. If the free end of flexible strip 20 is pulled through guide tabs 24 on opposing flexible strip 21, nibs 23 can snap into openings 22 in various positions.

Support 25, comprising the two flexible strips 20 and 21, can also be adapted to the cross-section of a cable strand by bending over strips 20 and 21 and pulling them tight.

Finally, FIGS. 18 to 21 show a practical example in which support 26 has two lateral webs 28 each located on a lateral edge of chain link 27, and at least one connecting web 29 that is arranged between lateral webs 28 and can be shifted to different positions in the longitudinal direction of lateral webs 28. As shown particularly clearly in FIGS. 19 and 21, lateral webs 28 have guide rails 30 running in the longitudinal direction on both sides and connecting web 29 has lateral guide grooves on its ends for sliding adjustment along lateral webs 28. The guide grooves of connecting web 29 are located on guide rails 30 of lateral webs 28 in non-positive fashion, meaning that connecting web 29 can only be shifted along lateral webs 28 by applying a predetermined force.

Stops 31 for connecting web 29 are provided on the free ends of lateral webs 28.

By shifting connecting web 29 along lateral webs 28, support 26 can be manually adapted to the respective cross-section of the cable strand without altering or exchanging any parts.

As shown in FIGS. 19 and 21, connecting web 29 can be used as a separating web to divide the interior of support 26 into individual chambers.

In the practical examples shown in the drawings, chain links 5, 9, 15, 19 and 27 are of cranked design, each having in reference to associated supports 1, 12, 18, 25 and 26 an outwardly cranked region 32 and an inwardly cranked region 33, which display connecting means for hinged connection of the chain links to adjacent chain links. The inside of outwardly cranked region 32 is in contact with inwardly cranked region 33 of the adjacent chain link.

The means for connecting the chain links comprise pins 34 and corresponding openings 35 in the respective hinge regions of the chain links. In order to ensure sufficient tightness of the connection between chain links, pins 34 have circumferential projections 36 for snap-fitting insertion into openings 35.

LIST OF REFERENCE NUMBERS

1 Support
2 Cables
3 Flexible strip
4 Opening
5 Chain link
6 Hinged axis
7 Opening
8 Opening
9 Chain link
10 Web
11 Opening
12 Support
13 Flexible strip
14 Flexible strip
15 Chain link
16 Nibs
17 Opening
18 Support
19 Chain link
20 Flexible strip
21 Flexible strip
22 Opening
23 Nibs
24 Guide tab
25 Support
26 Support
27 Chain link
28 Lateral web
29 Connecting web
30 Guide rail
31 Stop
32 Outwardly cranked region
33 Inwardly cranked region
34 Pins
35 Openings
36 Projection

What is claimed is:

1. Energy drag chain for guiding cables and/or tubes between two connection points that are movable relative to each other, where the chain comprises a single strand of flat chain links that are hinged to one another and can bend relative to one another, and where at least some of the chain links are provided with a support comprising a compartment for receiving cables that is open in the longitudinal direction of the chain, and the support comprising two flexible strips in the form of webs having flexible ends, one end of each of the two flexible strips being attached at a lateral edge of the chain link and each displaying fastening elements for connection to one another in various positions in the longitudinal direction relative to one another.

2. Energy drag chain according to claim 1, characterised in that one of the flexible strips has openings distributed in the longitudinal direction and the other flexible strip has nibs distributed in the longitudinal direction that can be pressed into the openings.

3. Energy drag chain according to claim 1, characterised in that the two flexible strips comprise a longer flexible strip with openings distributed in the longitudinal direction and a shorter flexible strip which has nibs arranged in the longitudinal direction on its outer side that have a longitudinal cross-section of toothed shape for snapping into the openings, where guide tabs are provided on the outer side of the shorter flexible strip, on either side of the nibs, in order to hold the longer flexible strip in place when it is bent over the outer side of the shorter flexible strip.

4. Energy drag chain for guiding cables and/or tubes between two connection points that are movable relative to each other, where the chain comprises a single strand of flat chain links that are hinged to one another and can bend relative to one another, and where at least some of the chain links are provided with a support comprising a compartment for receiving cables that is open in the longitudinal direction of the chain, where the support has two lateral webs, each of which is provided at a lateral edge of the chain link, characterised by at least one connecting web, which is arranged between the lateral webs and can be adjusted in the longitudinal direction of the lateral webs, wherein two sides of the lateral webs have guide rails in the longitudinal direction and the connecting web has lateral guide grooves on each end of the connecting web for sliding adjustment along the lateral webs.

5. Energy drag chain according to claim 4, characterised in that a snap connection is provided between the lateral webs and the connecting web in order to lock it in various positions.

6. Energy drag chain according to claim 4, characterised in that free ends of the lateral webs are each provided with a stop for the connecting web.

7. Energy drag chain comprising a single strand of flat links capable of being hinged to one another; at least a portion of the links comprising a support for receiving cables, the support being open in a longitudinal direction of the chain and comprising at least one flexible strip and two flexible ends which can be connected to one another; and wherein each chain link comprises a pin in one hinge region and a corresponding opening in another hinge region, in order to enable hinged connection of the chain links to one another.

8. Energy drag chain according to claim 7, characterised in that a snap connection is provided between the pins and openings of connected chain links.

9. Energy drag chain for guiding cables and/or tubes between two connection points that are movable relative to each other, where the chain comprises a single strand of flat chain links that are hinged to one another and can bend relative to one another, and where at least some of the chain links are provided with a support defining compartment for receiving cables that is open in the longitudinal direction of the chain, the support comprising two flexible webs having flexible ends, one end of each of the two flexible webs being attached at a lateral edge of the chain link, and each flexible web comprising a plurality of opposed openings, the support further comprising a flexible strip capable of passing through an opposed opening of each web.

10. Energy drag chain according to claim 9, wherein the flexible strip is capable of forming a loop through an opposed opening on each web.

11. Energy drag chain for guiding cables and/or tubes between two connection points that are movable relative to each other, the chain comprising a strand of generally flat chain links that are hinged to one another and can bend relative to one another; and a flexible support provided on at least some of the chain links, the support defining a compartment having an adjustable cross-section for receiving cables that is open in the longitudinal direction of the chain, the support comprising a flexible strip having two flexible ends, the flexible strip passing through lateral openings in the link, the ends of the flexible strip capable of being connected to define a loop.

12. Energy drag chain according to claim 11, wherein the flexible strip comprises a cable binder.

13. Energy drag chain according to claim 11, wherein the flexible strip passes through a transverse channel in the chain link.

14. Energy drag chain according to claim 11, wherein the support is arranged in between opposed hinge regions of the chain links.

15. Energy drag chain according to claim 11, wherein the chain links comprise a cranked design having, in reference to the support, an outwardly cranked region and an inwardly cranked region which are provided with connecting elements for the hinged connection of the chain links to adjacent chain links, where the inside of the outwardly cranked region of a link is in contact with the inwardly cranked region of the adjacent link.

* * * * *